United States Patent [19]

Bilsky et al.

[11] 4,281,278
[45] Jul. 28, 1981

[54] REDUNDANT BATTERY PROTECTION SYSTEM

[75] Inventors: Herbert W. Bilsky, Lawrenceville, N.J.; Patrick J. Callen, Yardley, Pa.

[73] Assignee: RCA Corporation, New York, N.Y.

[21] Appl. No.: 100,454

[22] Filed: Dec. 5, 1979

[51] Int. Cl.³ .......................... H02J 7/10; H01L 31/00
[52] U.S. Cl. ...................................... 320/13; 136/293; 323/906; 320/57
[58] Field of Search ....................... 320/13, 14, 39, 40, 320/57, 61; 323/15; 307/146; 136/206, 291, 293

[56] References Cited

U.S. PATENT DOCUMENTS 3,997,830  12/1976  Newell et al. ..................... 320/22 X Primary Examiner—Robert J. Hickey
Attorney, Agent, or Firm—Samuel Cohen; Robert L. Troike

[57] ABSTRACT

A satellite power system in which solar cells provide power to a load during sunlight hours and also charge, through regulators, rechargeable batteries which provide power during dark periods. In order to prevent the batteries from being overcharged by solar cell current bypassing the regulators (through the load connection) each battery is protected by a redundant protection system including a pair of diodes and switch means normally connecting one of the diodes between the battery and the load. If the one diode fails or shorts, the switch means connects the other diode between the battery and the load; the voltage across the one diode and current therethrough are sensed to determine if the diode has failed.

4 Claims, 3 Drawing Figures

REDUNDANT BATTERY PROTECTION SYSTEM

This invention relates to a battery power system and more particularly relates to a redundant battery protection system with reduced power loss.

Satellites often employ solar cells arranged in an array as the primary power source. During dark or eclipse periods of the satellite's orbit, rechargeable batteries provide the power. The batteries are charged during the sunlight hours by battery charge regulators powered by the solar array.

Each of the batteries is connected to the load through a set of diodes to prevent the solar array current from bypassing the charge regulators and delivering uncontolled current to the batteries and consequently damaging them. In satellite systems, redundant diode protection systems have been used to continue battery protection despite the failure of one of the diodes. In a typical configuration, there is a quad-connected set of these diodes between each of the batteries and the load. This arrangement consumes valuable power and the failure of one diode can cause the amount of discharge of the associated battery to exceed the design limit and reduce the life of the battery.

A redundant battery protection system embodying the invention includes a pair of unidirectional devices and a switch means for normally switching a first of said devices between the battery being protected and the load. The protection system includes means for sensing the voltage across the first device and the current through the first device for providing a control signal to the switch when the device fails, that is, when it becomes shorted. The switch, in response to the control signal, couples the second device between the battery and the load.

Figure 1:
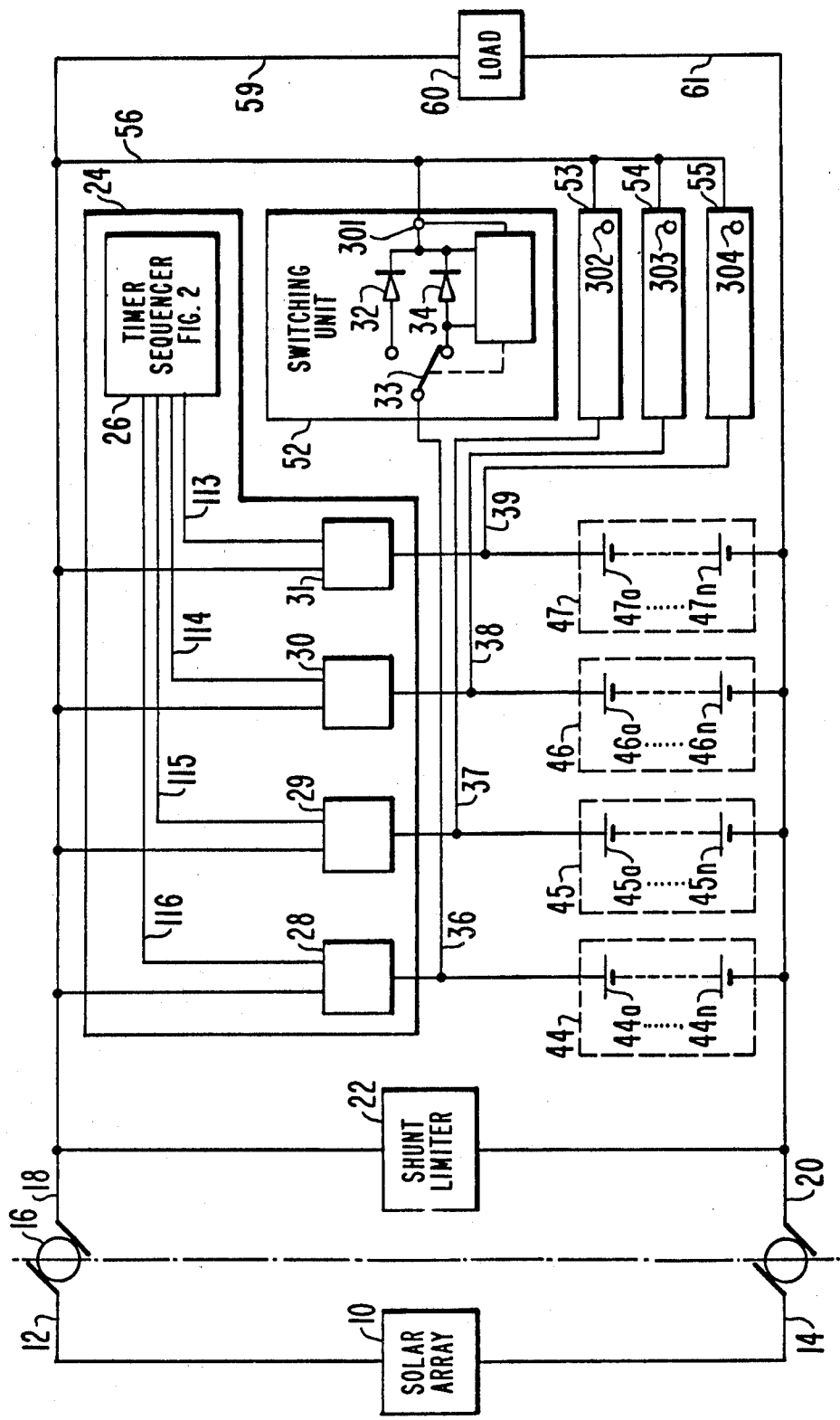
FIG. 1 is a block diagram of a battery charging system.

FIG. 1 illustrates, by way of example, components of a satellite borne battery system. The energy for recharging a secondary power source, comprising a plurality of battery cells to be discussed, is supplied from a solar array 10, a slip-ring assembly 16, and shunt limiter 22.

The solar array 10, slip-ring assembly 16, and shunt limiter 22 are well-known in the satellite art. The array 10 supplies for a typical system for example, approximately 14.3 amperes for transfer to the shunt limiter 22 which, in turn, limits the voltage to 35 volts. The solar array 10 transfers the current to the shunt limiter 22 via busses 12 and 14, slip-ring assembly 16 and busses 18 and 20. The shunt limiter may be a zener diode which clamps the voltage maximum at 35 volts. The current is applied to a plurality of battery cells, shown in FIG. 1 as four groups 44a ... 44n, 45a ... 45n, 46a ... 46n, and 47a ... 47n, via the busses 18 and 20 and a battery charging assembly 24. It should be understood that the invention is not limited to four groups of battery cells. The number of groups of battery cells is preferably determined by the power and redundancy required by the satellite subsystems. The battery cells are, for example, of nickel-cadmium (Ni-Cd) type. Battery cells 44a ... 44n, 45a ... 45n, 46a ... 46n, 47a ... 47n, will hereinafter be referred to as batteries 44, 45, 46, and 47, respectively. Each battery 44, 45, 46, and 47 may contain 22 cells, for example.

Battery charger assembly 24, comprising battery chargers 28, 29, 30, and 31 and timer sequencer 26, is connected to batteries 44–47. Batteries 44, 45, 46, and 47 are respectively connected to battery chargers 28, 29, 30, and 31. Timer sequencer 26 controls the sequence of charging of the batteries and charging rate of the battery chargers 28, 29, 30 and 31 via signal paths 116, 115, 114 and 113, respectively. For more details, see copending application (RCA 73,718) for "Battery Charging System" by the same inventors, filed concurrently herewith.

The outputs of battery chargers 28, 29, 30 and 31 are connected in parallel to switching units 52, 53, 54 and 55 and batteries 44, 45, 46 and 47, respectively. Batteries 44, 45, 46 and 47 are connected, via switching units 52, 53, 54 and 55, respectively, to the satellite subsystems represented as a load 60 connected across paths 59 and 61 and having a value of, for example, 500 watts. The bias voltage across diodes 32 or 34, contained within each switching logic 52, 53, 54 and 55 determines if the batteries 44, 45, 46 and 47 are electrically coupled to load 60. For example, when the voltage across battery 44, which is connected to the anode of either diode 32 or 34 of switching unit 52, is greater than voltage across the load 60, which is connected to the cathode of diodes 32 and 34, then diode 32 or 34 is forward biased and battery 44 is electrically coupled to load 69.

Current sensors 301 thru 304 located at the output of each switching unit 52, 53, 54 and 55, sense the current to the load. Also, the voltage is sensed and processed as discussed further in connection with FIG. 3.

Figure 2:
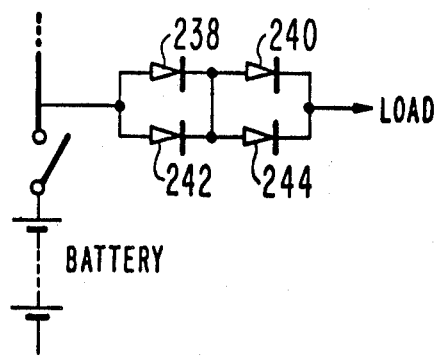
FIG. 2 illustrates a prior art protection device of redundant diodes in the battery discharge path.

In the prior art, the switching units 52, 53, 54 and 55 are typically like that shown in FIG. 2 for providing the redundant battery protection. As shown in FIG. 2, four diodes 238, 240, 242 and 244 are connected in a so-called "quad" arrangement at the output of each battery. The purpose of the quad arrangement is to ensure that the battery is charged by only its charger and to prevent the solar array current from bypassing the charge regulators and delivering uncontrolled current to the batteries. Diodes 238 and 242 are shunted to each other and this shunt connection is serially connected to another shunt connection of diodes 240 and 244. If all diodes 238 thru 244 are conducting current, their combined power dissipation is roughly equal to the power dissipated by two conducting diodes connected in series (which is double the power which would be dissipated by a single diode carrying the same current as passes through the quad). In a typical satellite system where the battery voltage (in eclipse) is 26.5 volts average, the power consumed by these diodes ia approximately 30 watts which may be about 6% of the total load of the satellite system. If any one of the diodes 238 thru 244 becomes short circuited, the voltage drop across the quad changes to a value approximately equal to one-half the previous voltage drop. The decrease in the diode quad voltage drop created by a shorted diode condition causes the battery associated therewith to deliver an unplanned-for increase in the amount of energy it delivers to the load 60 as compared to the other batteries. Increasing the amount of energy supplied to the load from a particular battery beyond that planned for increases the so-called "depth of discharge" for that battery which correspondingly reduces the life of the battery.

Figure 3:
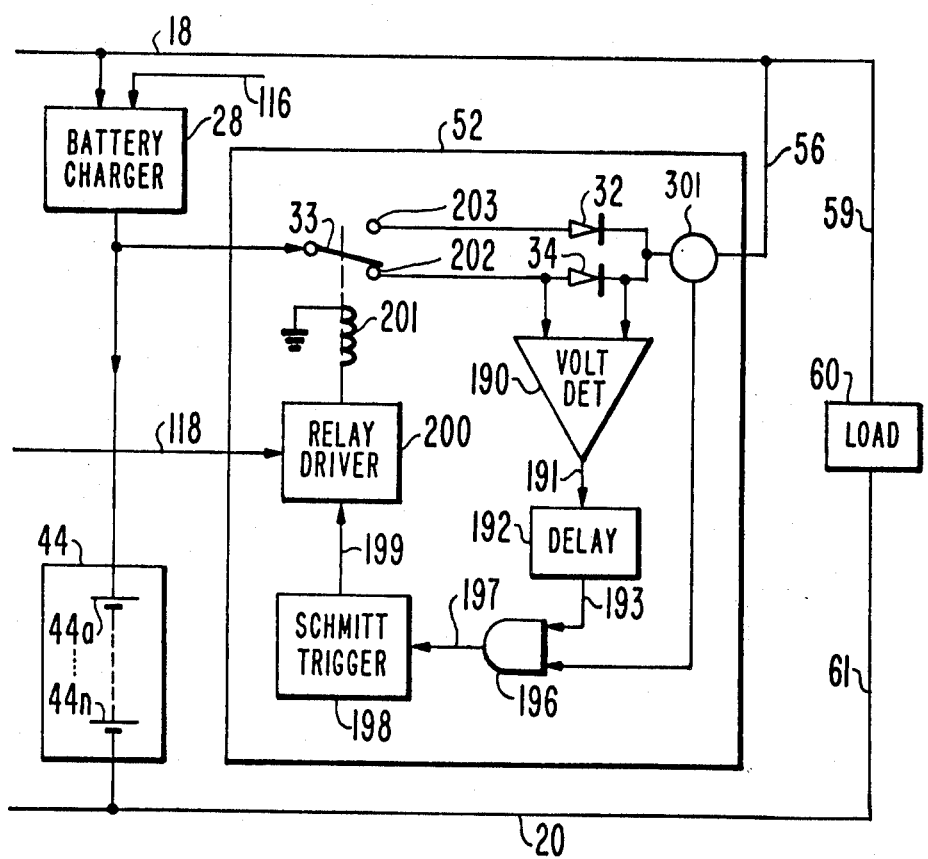
FIG. 3 is a block diagram of the redundant battery protection system embodying the present invention.

Reference is now made to FIG. 3 which shows more details of the switching unit 52. FIG. 3 also shows the interconnection of the battery charger 28, switching unit 52 and battery 44. Battery charger 28 charges battery 44 with the current supplied from the solar array (shown in FIG. 1) via the bus 18. It should be understood that each of the other battery chargers 29, 30 and 31 have associated therewith a switching unit similar to that shown in FIG. 3. Battery 44 is connected to battery charger 28. Switching unit 52 connects battery 44 to load 60 under normal conditions through diode 34 and reconnects battery 44 to load 60 through diode 32 when diode 34 fails in a shorted condition. For a non-failure condition, shown in FIG. 3, diode 34 provides the connection of battery 44 to load 60 via switch 33, contact 202, current sensor 301, lead 56 and lead 59. Current sensor 301 provides a positive signal at AND gate 196 indicating current flow. This current sensor 301 may be a low valued series resistor with the voltage across this resistor providing the positive output signal. Voltage detector 190, shunted across diode 34, senses the voltage drop across diode 34 generated by the current passing through the diode, this current being supplied by battery 44. If the voltage drop across diode 34 is approximately zero volts or the cathode is slightly positive with respect to the anode (indicating when current is sensed a short circuit) and sensor 301 senses current indicating current flowing into the battery, there is cause for alarm as the current flow, in either case, may, with time, cause damage to the battery. For this shorted diode condition, voltage detector 190 generates a positive voltage signal on path 191 which is connected to a time delay means 192. Time delay means 192 generates a positive voltage on signal path 193 after a predetermined time, e.g., in the order of 0.35 seconds for 0.1 voltage drop across cathode to anode. This time delay is to prevent false switching due to charging transients. If a current sensing signal is also present on signal path 195 from sensor 301, AND circuit 196 provides a positive voltage signal on path 197 to a Schmitt trigger circuit 198. Schmitt triger 198, in turn, generates a positive signal on lead 199 to activate relay driver 200. Relay driver may also be activated via path 118 by a manual control signal for switching diode 32 in the line for an open circuit condition (for example, if diode 34 should burn out). Relay driver 200 energizes coil 201 to thereby transfer the connection of switch 33 from its normally-closed contact 202 to its normally-open contact 203. Contact 203 is connected to diode 32. Thus, when diode 34 manifests a shorted condition, switching unit 52 automatically removes diode 34 from the battery discharge path and replaces it with diode 32.

It should be recognized that switching unit 52 provides a circuit having redundancy whereby only one diode 34 or 32 is in the battery 44 discharge path at any one time. This is advantageous over prior art devices having four diodes arranged in two pairs in the battery discharge with safeguarding against open and shorted diode conditions.

The switching units 52 thru 54, having switchable diodes 34 and 32 provide diode redundancy in the battery discharge path but only one diode is connected at any time. Having one diode in the battery discharge path rather than a quad reduces by about one-half the power dissipation in the circuit during normal operating conditions as well as eliminates any changes in the voltage drop in the battery discharge path during the failure mode and thus eliminates any changes in the proportionate amount of energy (watt-hours) delivered to the load by each battery.

What is claimed is:

1. A system for coupling a battery to a load, comprising:
   first and second unidirectionally conducting devices, each connected at one like terminal to the load, and each having a second terminal;
   controllable switch means normally connecting said battery to the second terminal of said first device for causing a flow of current therethrough to said load, thereby normally producing a voltage drop in the forward direction across said first device;
   sensing means for sensing (a) the current flow between said battery and said load and (b) the voltage across said first device; and
   means coupled to said sensing means responsive to the presence of said current flow between said battery and said load and the substantial absence of a forward voltage drop across said first device for operating said controllable switch means causing it to switch the connection of the battery from the second terminal of the first device to the second terminal of the second device.

2. The system of claim 1 wherein said unidirectional device comprises diodes.

3. A system as set forth in claim 1 wherein said sensing means comprises:
   a voltage sensor connected across said first device; and
   a current sensor connected in series between said battery and said load.

4. A system as set forth in claim 3, further including:
   means for manually operating said controllable switch means.

* * * * *

UNITED STATES PATENT AND TRADEMARK OFFICE
CERTIFICATE OF CORRECTION

PATENT NO. : 4,281,278

DATED : July 28, 1981

INVENTOR(S) : Herbert W. Bilsky et al.

It is certified that error appears in the above-identified patent and that said Letters Patent is hereby corrected as shown below:

Column 3, line 41 - "triger" should be -- trigger --.

Column 4, line 6 - "with" should be -- path --.

Signed and Sealed this

Twenty-ninth Day of September 1981

[SEAL]

Attest:

GERALD J. MOSSINGHOFF

Attesting Officer

Commissioner of Patents and Trademarks